Figure 1:
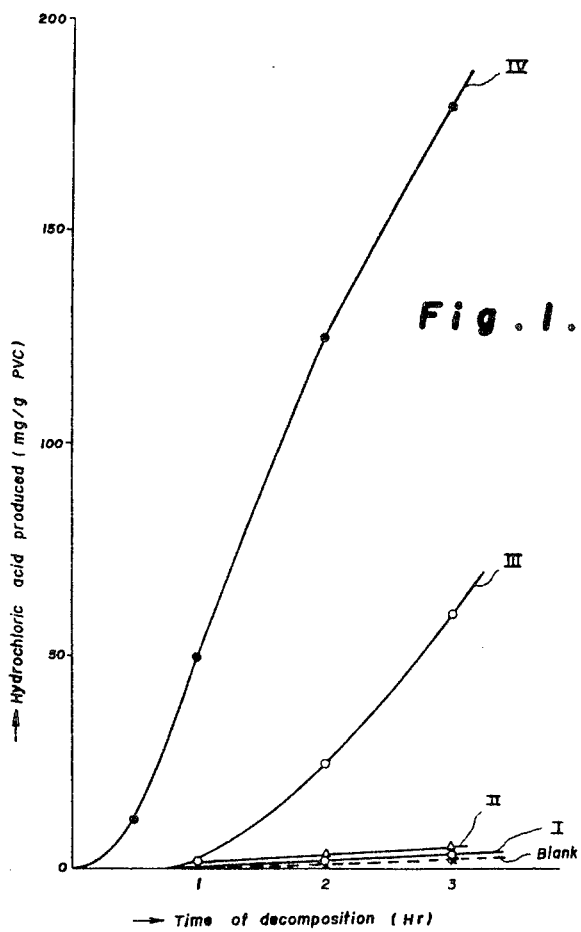

3,268,564
QUATERNARY AMMONIUM PERHALOGENATE
SALTS
Takashi Yamamoto, Amagasaki, Japan, assignor to Nippon Oils and Fats Company Limited, Tokyo, Japan, a corporation of Japan
Filed May 24, 1963, Ser. No. 282,945
Claims priority, application Japan, May 31, 1962, 37/22,409; Aug. 15, 1962, 37/35,369; Sept. 27, 1962, 37/42,295, 37/42,296
3 Claims. (Cl. 260—404.5)

The present invention relates to quaternary ammonium perhalogenates and a method of producing the same, and to their use as anti-static agents for high molecular weight polymeric materials.

High molecular materials have a high electric resistivity and are intended to be charged with static electricity occurred by frictional contact and rubbing and attract dust and dirt in the air and become dirty. Particularly, plastic material produces spark during its treatment and persons handling such material are often subjected to troublesome electrical shocks.

The gramophone records made of plastic material attract on the surface thereof dust and dirt owing to the static electricity occurred, which results in an occurrence of noise during playing of the record, a shortage of the life of record and stylus, and also a deformation of the sound tracks.

Fabrics electrically charged become bad in appearance.

The conventional anti-static agents for the high molecular materials, heretofore, proposed comprise quaternary ammonium salts having nitric acid, halogen, or other anions as an anion. Such anti-static agents, however, have the tendency to accelerate the heat degradation of the high molecular materials causing changes in the colour and physical characteristics when subjected to a high temperature treatment, so the materials treated with these agents can not apply to commercial fields.

An object of the present invention is to overcome the above disadvantage and to provide a quaternary ammonium perhalogenate as anti-static agent for high molecular materials, which is permanent in effect notwithstanding the water washing, contact, friction, etc. subjected to the high molecular material, and which serves to give a high heat resistance property and substantially no colour change to the high molecular material even when it is subjected to a high temperature treatment e.g. 150–180° C.

In accordance with the invention the above object can be attained by an anti-static agent, which is a quaternary ammonium salt containing a perhalogen acid anion as an anion and is represented by the following general formula $$\left[ R_1 - \underset{\underset{R_3}{|}}{\overset{\overset{R_2}{|}}{N}} - R_3 \right]^+ XO_4^-$$

wherein X represents a halogen; $R_1$ represents an aliphatic, substituted aliphatic, amido, or N-substituted amido radical having at least 6 carbon atoms; $R_2$ and $R_4$ represent hydrogen and lower alkyl radicals; and $R_3$ represents a lower hydroxyalkyl radical.

In the present invention, examples of $R_1$ are aliphatic hydrocarbon radicals such as hexyl, heptyl, noctyl, octenyl, nonyl, decyl, decenyl, undecenyl, dodecyl, tridecyl, tridecenyl, tetradecyl, tetradecenyl, hexadecyl, hexadecenyl, heptadecyl, heptadecenyl, octadecyl, octadecenyl, the residue of behenic acid and the like; substituted aliphatic hydrocarbon radicals such as mono- and poly halogenated aliphatic hydrocarbon radicals, alkyl benzene groups and the like; and amido radicals (RCONH—) in which R is any of the above exemplified aliphatic radicals, and N-substituted derivatives of such amido radicals in which the N-substituent is an alkyl group such as ethyl, propyl, butyl, hexyl and the like.

Examples of $R_2$ and $R_4$ in addition to hydrogen, are alkyl radicals such as methyl, ethyl, propyl, isopropyl, n-butyl, sec-butyl, t-butyl and the like. Examples of $R_3$ are hydroxyalkyl radicals such as hydroxyethyl, hydroxypropyl, 2-hydroxypropyl, hydroxy (polyethoxy) ethyl, and the like.

The high molecular materials to which the quaternary ammonium salt according to the invention may be applied include natural and synthetic fibres, resin, rubber, leather or paper.

The high molecular materials treated with a quaternary ammonium salt according to this invention have heat resistant properties which are not decreased even when moulded while being heated or subjected to a high temperature. In order to give to the high molecular material the anti-static property according to the present invention, it is particularly advantageous to add the quaternary ammonium salt to the high molecular material by means of conventional impregnating, spraying, and blending treatments such that the high molecular material contains 0.2–15% of the quaternary ammonium salt. The anti-static property may desirably be given to the high molecular material by blending it with the quaternary ammonium salt. The quaternary ammonium salt may be impregnated in the fibres, fabrics, etc. and may be blended with or coated on worked articles such as plate, sheet etc.

In case of giving the anti-static property to fibres, the fibres are immersed in an aqueous solution having a suitable concentration of the quaternary ammonium salt, or in a solution of a solvent such as methanol, ethanol, acetone, benzene etc. In case of giving the anti-static property to resins such as plastic etc., the resin in powder or pellet form is blended with a solution of the quaternary ammonium salt with the aid of rolls, a mixer etc, and then moulded in a conventional mould. It is advantageous to produce a resin material blended with the product according to the invention.

In accordance with the invention, the high molecular material becomes highly heat resistant without changing colour even when subjected to high temperature treatment. The anti-static property of the high molecular weight polymeric material is superior to that obtained through the use of a conventional product and permanent in effect such that it is not decreased even when the material is subjected to wind and rain, contact, friction, water washing etc.

If a fabric is treated as above described, it becomes not only anti-static in property but also soft and smooth, which results in an improvement in texture. It has been found that the anti-charging effect of the fabric is not decreased even though the fabric is washed five times sucsively nor is the texture altered.

The effect of the quaternary ammonium salt according to the present invention and that of the conventional quaternary ammonium salt both added to the high molecular material, respectively, on the heat resisting property of the latter will now be compared. Polyvinyl chloride is used as the high molecular material.

The test is carried out based on ASTM–D–793–49, i.e. the amount of hydrochloric acid decomposed from the polyvinyl chloride containing 0.03 millimol of the quaternary ammonium salt per 1 g. PVC at 160° C. is measured from hour to hour. I to IV in FIG. 1 represent quaternary ammonium salts listed in the following Table 1.

TABLE 1

| No. | Products | Chemical formulas |
|---|---|---|
| I | Product according to the invention | $C_{17}H_{35}CONHC_2H_4N^{\oplus}(CH_3)_2C_2H_4OH \cdot ClO_4^{\ominus}$ |
| II | ___do___ | $C_{12}H_{25}N^{\oplus}(CH_3)_2C_2H_4OH \cdot ClO_4^{\ominus}$ |
| III | Conventional product | $C_{17}H_{35}CONHC_3H_6N^{\oplus}(CH_3)_2C_2H_4OH \cdot NO_3^{\ominus}$ |
| IV | ___do___ | $C_{12}H_{25}N^{\oplus}(CH_3)_3 \cdot Cl^{\ominus}$ |

As can be seen from FIG. 1, the more hydrochloric acid is produced the more PVC is decomposed. The conventional products III and IV speed up the decomposition of PVC, whilst the products I and II according to the invention do not accelerate the decomposition of PVC. This fact means that addition of the anti-static agent according to the present invention does not degrade the heat resistant property of PVC.

How to blend the quaternary ammonium salt with the high molecular material for the purpose of preventing accumulation of the charge on the high molecular material will now be explained in detail. As the high molecular material, use is made of moulded products and fibres. For the purpose of giving the anti-static property to the moulded products, a mouldable material is blended with the quaternary ammonium salt by the following method.

The quaternary ammonium salt according to the invention is dissolved in an organic solvent preferably having a relatively low boiling point or in water and the solution thus obtained is uniformly coated on the mouldable material. If desired, the solvent is evaporated by drying, to occlude air bubbles from the subsequently moulded product. Such drying process may be carried out at a lower temperature within a shorter time if use is made of a solvent having a boiling point less than 100° C.

The mouldable material to which is added the quaternary ammonium salt as above mentioned is moulded at a suitable treating temperature to obtain a moulded product having the anti-static property.

The treating temperature for PVC is 150–170° C., for polystyrene 180–220° C., and for vinyl chloride-vinyl acetate copolymer 130–150° C.

For such plastics, the quaternary ammonium salt is coated on the surface of the plastic to form a continuous electric conductive film which serves to conduct away the static charge occurring on the film. The quaternary ammonium salt contains a substitution radical having such affinity that it can be secured to the surface of the resin and cannot be removed by friction, contact, wind and rain etc.

Fibre may be immersed in the quaternary ammonium salt solution or such solution may be sprayed onto the fibre. If the fibre thus treated is heated at 50–100° C., an anti-static property is obtained, which results in a decrease of the electric resistance on the surface of the fibre from $10^{12}$ Ω for non-treated fibre to about $10^6$ Ω. A synthetic fibre having a permanent anti-charging property may also be obtained by the blending process. For example, PVC fibre may be spun by using a spinning solution mixed with a solution of the quaternary ammonium salt in benzene such that the fibre contains 0.2–15% of the quaternary ammonium salt. Molten spinning thread may be spun by directly adding thereto the pulverized quaternary ammonium salt. The reason why the above mentioned blending process can be performed is that the product according to the invention is excellent in heat stabilizing property, so that the heat resistant property of the high molecular material treated with the above product cannot be degraded. Thus, the product according to the invention renders it possible by mere addition thereof to the high molecular material and to the worked product thereof to give the anti-charging property to the latter without giving any inconvenient property, i.e. without degrading colour, tensile strength, chemical resisting property, and resistance against bacteria of the latter.

A method of producing the quaternary ammonium salt containing perhalogen acid anion as the anion is as follows. An organic amine and an alkylene oxide are brought together in the presence of water or an organic solvent and the quaternary ammonium hydroxide or the quaternary ammonium alkoxide thus obtained is neutralized continuously with perhalogen acid.

The organic amine is preferably an aliphatic amine and may be primary, secondary or tertiary.

The reaction may be carried out at a temperature of about 30–100° C. for ½–6 hours. More particularly, the organic amine is caused to react with a lower alkylene oxide of about 2–4 carbon atoms in the presence of a solvent to produce the quaternary ammonium hydroxide or the quaternary ammonium alkoxide. The quaternary ammonium hydroxide or alkoxide may be ascertained by means of a suitable indicating agent such as thymolphthalein or of pH meter immediately upon indication of quaternary ammonium hydroxide or alkoxide formation, it is neutralized with the acid continuously as it forms from the reaction of the amine and the alkylene oxide. For example, dimethyl dodecyl amine dissolved in alcohol is caused to react with ethyleneoxide. Then, a deflection of the pH meter indicates production of the quaternary ammonium hydroxide. Immediately thereafter, perhalogen acid is dropped on the quaternary ammonium hydroxide thus produced to neutralize the latter. The reaction, including the neutralization, is conducted continuously thereby precluding by-product glycol formation and insuring producing the desired product with a yield of 100%.

Figure 2:
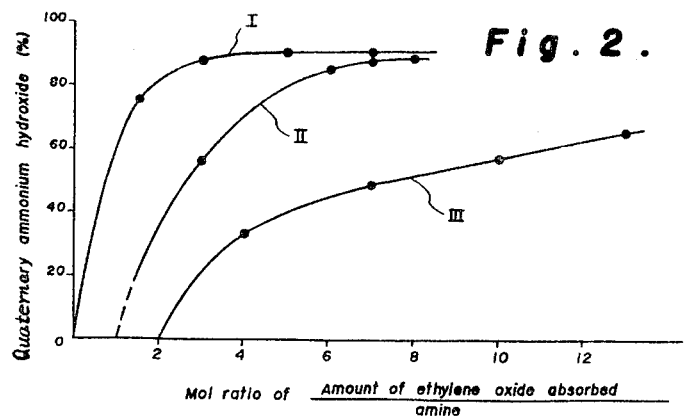

Curves showing relations between the quaternary ammonium hydroxide and a mol ratio between ethylene oxide absorbed and an organic amine are illustrated in FIG. 2. Curve I illustrates the case in which dimethyl dodecyl amine is used as the organic amine, curve II illustrates the case in which methyl dodecyl amine is used as the organic amine, and curve III illustrates the case in which dodecyl amine is used as the organic amine. The reaction temperature is 65–70° C. In the case of the curves I and II, the rate of producing theq uaternary ammonium hydroxide shown by the following Equation 1 reaches an equilibrium state at 90%, after which only the reaction shown by the following Equation 3 occurs. In the case of the curve III, the rate of producing the quaternary ammonium hydroxide is in the order of 60%.

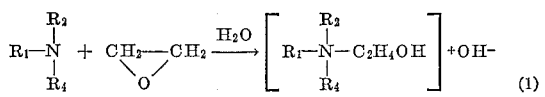
$$R_1-\underset{R_4}{\overset{R_2}{N}} + CH_2\!\!-\!\!CH_2 \xrightarrow{H_2O} \left[ R_1-\underset{R_4}{\overset{R_2}{N}}-C_2H_4OH \right] + OH^- \quad (1)$$

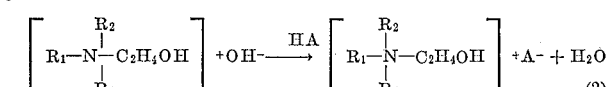
$$\left[ R_1-\underset{R_4}{\overset{R_2}{N}}-C_2H_4OH \right] + OH^- \xrightarrow{HA} \left[ R_1-\underset{R_4}{\overset{R_2}{N}}-C_2H_4OH \right] + A^- + H_2O \quad (2)$$

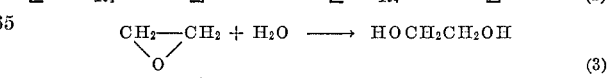
$$CH_2\!\!-\!\!CH_2 + H_2O \longrightarrow HOCH_2CH_2OH \quad (3)$$

The quaternary ammonium hydroxide thus produced is then neutralized with the perhalogen acid according to Equation 2. About 10% of amine (the rate for amine fed) in case of the curves I and II and 40% of amine (also the rate for amine fed) in case of the curve III are mixed as non-reaction product with the product obtained.

In the method according to the invention, the quaternary ammonium hydroxide is immediately and continuously subjected to neutralization as it is formed with the perhalogen acid, the reactions of the Equations 1 and 2 continuously and simultaneously proceeding. The continued presence of the quaternary ammonium hydroxide, which might induce the reaction of the Equation 3 in the reaction system is thus avoided. Thus, the reaction of the Equation 3 is prevented from occurring and the reaction of the Equations 1 and 2 are completed.

Thus, the method according to the invention makes it possible to readily carry out the reactions of the Equations 1 and 2 to obtain the quaternary ammonium salt in substantially 100% yield in the absence of non-reacted amine and by-product glycol formation.

The invention will now be described with reference to examples.

Example 1

21.4 g. (0.1 mol) of dimethyl dodecyl amine is dissolved in 70% ethanol. The mixture thus obtained is added with ethylene oxide at a temperature of 50–70° C. The quaternary ammonium hydroxide thus obtained is neutralized continuously as it is formed with 20% perchloric acid aqueous solution to produce the product II shown in the Table 1. The above reaction can be shown by the following equations.

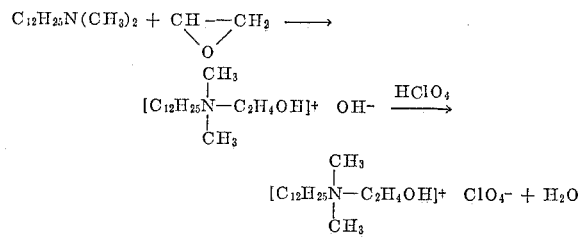

If use is made of stearamide ethyl dimethyl amine in place of dimethyl dodecyl amine the product I in the Table 1 can be obtained.

Example 2

21.4 g. (0.1 mol) of dimethyl dodecyl amine is dissolved in the same amount of ethanol as in the Example 1 and the mixture thus obtained is added with 45 g. of 20% perchloric acid. The product thus obtained is quaternized by ethylene oxide and subsequently added continuously with 5 g. of 20% perchloric acid to obtain the product II shown in the Table 1.

The experimental results on the product according to the invention applied to PVC plates will now be explained with reference to the folowing examples.

Hard polyvinyl chloride:
  PVC $p=800$ _____ g__ 100
  Stabilizing agent, dibutyl tin maleate _____ g__ 3
  Quaternary ammonium salt _____ m. mol__ 3
    (The quaternary ammonium salts are I, II, III and IV listed in the Table 1).

The above four compositions are fuly mixed and then subjected to roll mixing treatment at 170° C. for 10 minutes and subsequently pressed into plates each having a thickness of 1 mm. Various properties of the PVC plates thus obtained are as follows:

(1) Colour of PVC plate.

TABLE 2

| Product | I | II | III | IV | Blank |
|---|---|---|---|---|---|
| Colour | No | No | Brown | Dark Brown | No |

As can be seen from the above Table 2, the conventional products III and IV result in colouring on the worked plate, whilst the products I and II according to the invention have excellent property of obviating such colouring.

Various properties of PVC plate treated with the quaternary ammonium salts having $CH_3COO^\ominus$ (V), $I^\ominus$ (VI), $NO_3^\ominus$ (VII) instead of perhalogen acid anion as an anion in the product II shown in the Table 1 are shown in Table 3.

TABLE 3

| Anion | Product | Colour of worked plate |
|---|---|---|
| $CH_3COO^\ominus$ | V | Dark brown. |
| $I^\ominus$ | VI | Black. |
| $NO_3^\ominus$ | VII | Brown. |

Contrary to the above, the quaternary ammonium salt according to the invention and having a perhalogen acid anion when applied to the PVC plates produces no change in colour and thus provides a novel product showing no colour change. The quaternary ammonium salts having $FO_4^\ominus$, $BrO_4^\ominus$ and $IO_4^\ominus$ as anions instead of $ClO_4^\ominus$ are found to have the same effect as in the case of $ClO_4^\ominus$.

(2) Heat resistant property of PVC plate (at 180° C.)

Table 4 shows the test results of the heat resistant property of PVC plates heated at 180° C. in an oven.

TABLE IV

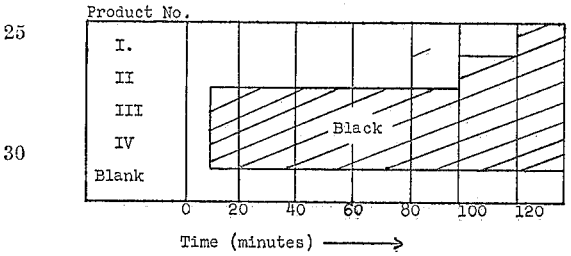

As can be seen from Table 4, the PVC plates treated with the conventional products III, IV become blackened at 180° C. for 10 minutes, whilst the PVC plates treated with the products I, II according to the invention are not blackened at the same temperature for the same time duration and show an excellent heat resistant property. If a stabilizing agent other than the dibutyl tin maleate of Example 3 is used, the PVC plate treated with the conventional products still becomes blackened at 180° C. for 10 minutes, whilst the heat resistant property of the PVC plate treated with the products according to the invention is not influenced by such different stabilizing agent. The heat resistant property of the PVC plate treated with the products according to the invention, however, is superior when the tin-containing stabilizer is used.

(3) Anti-static effect for PVC plate and permanence thereof.

The PVC plate is put in a vessel having a constant temperature and humidity at 20° C. and 60 RH, respectively, after the temperature and humidity have been adjusted for 50 hours, and then the surface resistivity and charge occurred on the plate due to friction are measured.

More particularly, the surface resistivity in Ω and the static charge in V are measured when the PVC plate is brought into frictional contact for 200 times/min. with a nylon tape stretched under a constant weight. Both values of the surface resistivity and the charge should preferably be small. Water washing of the PVC plate is carried out as a measure of permanence of the anti-static effect. The PVC plate is washed by water at 20° C. flowing with a rate of 2 lit./min. for 5 hours and the rate of decrease of the anti-static effect is observed. The rate of decrease of the anti-static effect for the PVC plate treated with the products according to the invention is less than that treated with the conventional products and while the degree of permanence of the anti-static effect is superior. This fact shows that the quaternary ammonium salt containing a perhalogen acid anion has a suitable mutual solubility, so that the quaternary ammonium salt is fixed to the surface of the resin and is not washed away.

The results of above test are shown in Table 5.

TABLE 5

| Property | Surface Resistivity (Ω) | Charge occurred by friction (V) | |
|---|---|---|---|
| | | Before washing | After washing |
| Product: | | | |
| I | 1×10⁷ | 30 | 200 |
| II | 2×10⁷ | 50 | 300 |
| III | 7×10⁷ | 80 | 700 |
| IV | 1×10⁸ | 100 | 800 |
| Blank | ᵃ10¹² | 3,000 | |

ᵃ More than.

*Example 4*

PVC comprising soft compositions such as 100 g. of PVC, 50 g. of DOP, 3 g. of dibutyl tin maleate, and 1.5 g. of quaternary ammonium salt (effective component) is formed into a sheet and the effect thereof is measured. The quaternary ammonium salts applied are I and III shown in the Table 1.

The treating conditions are as follows: The above compositions are blended by means of roll at 150° C. for 5 minutes, and finally pressed into a sheet under 70 atmosphere for 3 minutes. The colour of the sheet thus obtained and the heat resistant property thereof at 180° C. are shown in Table 6. The anti-static effect is shown in Table 7.

TABLE 6.—COLOUR CHANGE OF PVC SHEET AND ITS HEAT RESISTANT PROPERTY (AT 180° C.)

| Product | Colour change | Heat resistant property at 180°C |
|---|---|---|
| I | No | |
| III | Yellow | Black |
| Blank | No | |

Time (minutes) ⟶ (0, 20, 40, 60, 80, 100)

TABLE 7. ANTI-STATIC EFFECT OF PVC SHEET

| Product | Charge occurred by friction (V) | |
|---|---|---|
| | Before water washing | After water washing |
| I | 10 | 25 |
| III | 10 | 35 |
| Blank | 700 | 800 |

As can be seen from the above Tables 6 and 7, the product according to the invention and having ClO₄ anion gives to the PVC sheet an excellent heat resistant property and anti-static effect.

*Example 5*

Application of the quaternary ammonium salt to vinyl chloride-vinyl acetate copolymer.

The quaternary ammonium salt I is blended with a record material, i.e. vinyl chloride-vinyl acetate copolymer ($p=450$, content of PVAC is 12%) and formed into a plate. In this case, use is made of 3 g. of dibutyl tin maleate as a stabilizing agent and 1.2 g. of the product I according to the invention per 100 g. of the resin. The treating conditions are as follows: The compositions are rolled at 135° C. for 5 minutes and pressed into a plate under 10 atm. at 150 C. for 1 minute and under 100 atm. at 150° C. for 1 minute. The colour of the plate thus obtained and the heat resistant property at 150° C. are shown in Table 8. The anti-static effect is shown in Table 9.

TABLE 8.—COLOUR CHANGE AND HEAT RESISTANT PROPERTY OF COPOLYMER PLATE

| Product | Colour change | Heat resistant property at 150°C |
|---|---|---|
| I | No | |
| III | Yellow | Black |
| Blank | No | |

Time (minutes) ⟶ (0, 20, 40, 60, 80, 100, 120)

TABLE 9. ANTI-STATIC EFFECT OF COPOLYMER PLATE

| Product | Charge occurred by friction (V) | |
|---|---|---|
| | Before water washing | After water washing |
| I | 140 | 350 |
| III | 200 | 600 |
| Blank | 2,400 | 2,500 |

*Example 6*

Application of the quaternary ammonium salt to polystyrol.

Polystyrol in pellet form is blended with 1.2 parts of the product I per 100 parts resin and the mixture thus obtained is rolled at 200° C. for 10 minutes and pressed into a plate under 10 atmosphere at 200° C. for 1 minute. The charge occurred on the polystyrol plate due to friction is 200 v., whilst the charge of a blank is 2,500 v. This fact shows that addition of the product I to the polystyrol plate prevents charging on the polystyrol plate.

*Example 7*

Application of the quaternary ammonium salt to synthetic fibres.

1 g. of tetron fibre and/of nylon fibre both completely washed are immersed in 10% aqueous solution of the product I according to the invention. The fibres are picked up and are squeezed to the double weight of the fibres, and then dried at 70° C. for one hour. The temperature and humidity of the fibres are adjusted to 20° C. and 60 RH, respectively, and then the electrical resistance of the fibres is measured.

The fibres are washed repeatedly at 40° C. for 10 minutes with the aid of 2% aqueous solution of alkylbenzene sodium sulfonate and subsequently the change of the anti-static effect of the fibres is measured, the results being shown in Table 10.

TABLE 10.—ANTI-CHARGING EFFECT (Ω)

| Fibre | After treatment | Number of washings | | | | |
|---|---|---|---|---|---|---|
| | | 1 | 2 | 3 | 4 | 5 |
| Nylon | 2×10¹⁶ | 3×10⁸ | 6×10⁸ | 2×10⁹ | 8×10⁹ | 6×10¹⁰ |
| Tetron | 2×10⁹ | 3.5×10⁷ | 8×10⁸ | 1×10⁹ | 7×10⁹ | 3×10¹⁰ |

Blank: Less than 10¹².

As can be seen from the above Table 10, the anti-static effect of the fibres is maintained even after the five washing treatments. This is a novel fact which has never been attained by the conventional quaternary ammonium salts.

It will be obvious that the invention is not restricted to the examples described above and that those skilled in the art may apply many variations within the scope of the invention.

What I claim is:
1. A quaternary ammonium perhalogenate having the formula:

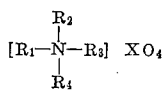

in which X is a halogen; $R_1$ is a member selected from the group consisting of alkyl, alkyl carboxamido, and N-lower alkyl substituted alkyl carboxamido radicals in which the alkyl has at least 6 carbon atoms; $R_2$ and $R_4$ are members selected from the group consisting of hydrogen and lower alkyl radicals; and $R_3$ is a lower hydroxyalkyl radical.

2. A quaternary ammonium perhalogenate having the formula $C_{17}H_{35}CONHC_2H_4N(CH_3)_2C_2H_4OH \cdot ClO_4$.

3. A quaternary ammonium perhalogenate having the formula $C_{12}H_{25}N(CH_3)_2C_2H_4OH \cdot ClO_4$.

References Cited by the Examiner

UNITED STATES PATENTS

| | | | |
|---|---|---|---|
| 2,256,958 | 9/1941 | Muskat | 260—567.6 |
| 2,299,782 | 10/1942 | Allen et al. | |
| 2,626,876 | 1/1953 | Carnes | 260—404 |
| 2,897,170 | 7/1959 | Gruber | 260—567.6 |
| 3,011,918 | 12/1961 | Silvernail | 117—201 |
| 3,082,227 | 3/1963 | Sherr | 260—404.5 |

FOREIGN PATENTS

| | | |
|---|---|---|
| 842,842 | 7/1960 | Great Britain. |
| 73,781 | 12/1953 | Netherlands. |

OTHER REFERENCES

Bihan et al.: C.A., vol. 43, pp. 6977–6978 (1949).
Meyer et al.: Ber. Deut. Chem., vol. 54, pp. 2274–2279 (1921).
Nisbet et al.: C.A., vol. 44, p. 35406 (1950).
Zissmann: Comptes rend., vol. 238, pp. 1843–5 (1954).

CHARLES B. PARKER, *Primary Examiner.*
IRVING MARCUS, *Examiner.*
FLOYD D. HIGEL, *Assistant Examiner.*